UNITED STATES PATENT OFFICE.

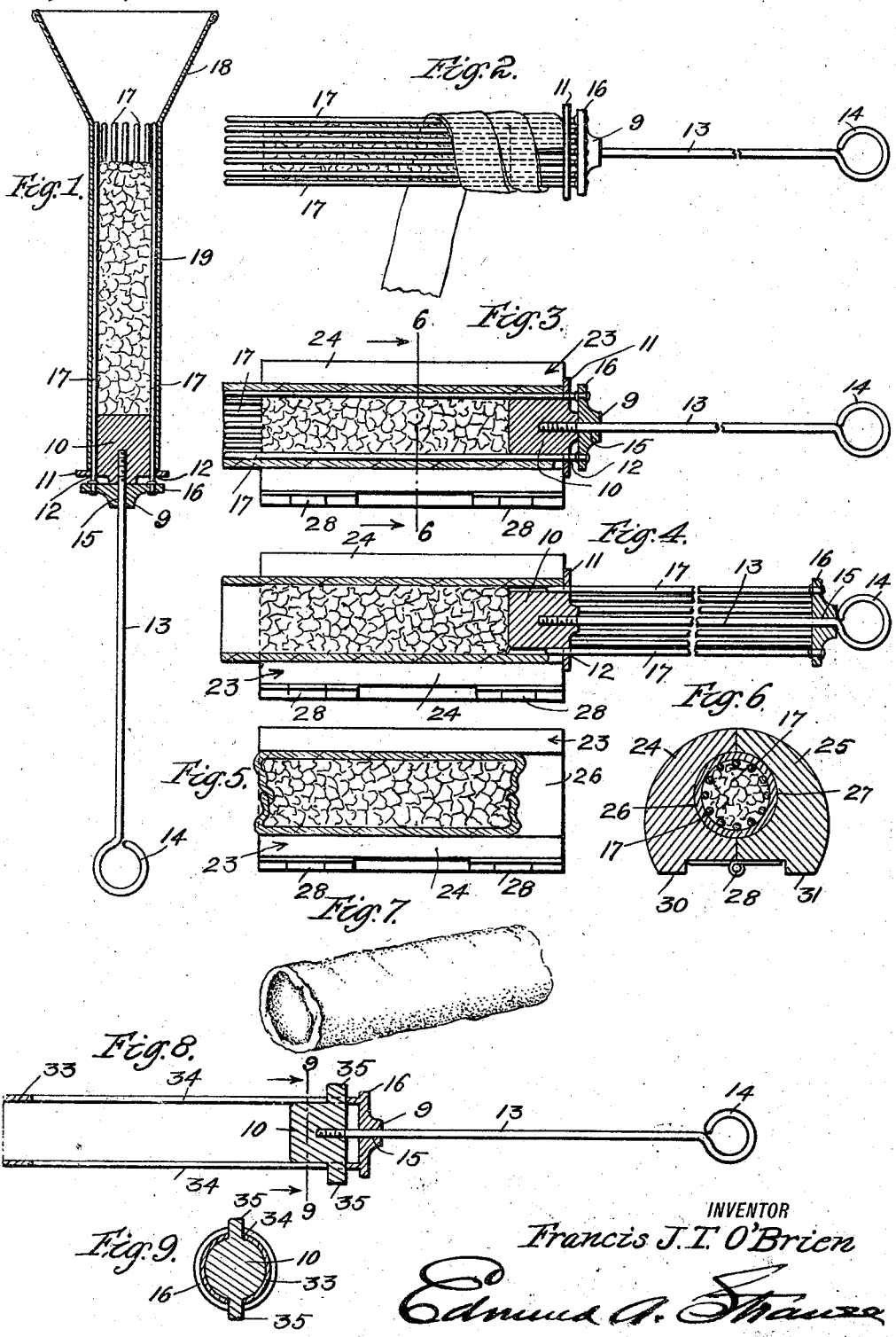

FRANCIS J. T. O'BRIEN, OF OCEAN PARK, CALIFORNIA.

APPARATUS FOR PREPARING FOOD PRODUCTS.

1,409,463.    Specification of Letters Patent.    Patented Mar. 14, 1922.

Application filed July 14, 1919, Serial No. 310,643. Renewed August 22, 1921. Serial No. 494,378.

*To all whom it may concern:*

Be it known that I, FRANCIS J. T. O'BRIEN, a citizen of the United States, residing at Ocean Park, in the county of Los Angeles and State of California, have invented new and useful Improvements in Apparatus for Preparing Food Products, of which the following is a specification.

My invention relates to an apparatus for preparing food products, preliminary to the cooking of the same, and is more particularly directed to that class of food products which has an edible substance encased in a covering of dough, which is then boiled, baked or cooked in any other suitable manner.

The object of my invention is to provide a simple apparatus which may be conveniently manipulated by the operator to form a food product, comprising an outer casing of food dough and an inner filling of another kind of food product, whereby said product may be conveniently cooked in any desired manner.

Another object of my invention is to provide an apparatus which may be used to form a shell or outer casing of food dough from a ribbon of food dough, wound in overlapping spiral relation and finally molded into an integral cylindrical shell, adapted to completely encase a food product of another character.

Other objects of my invention will appear in the following description, will be pointed out in the appended claims, and embodied in the accompanying drawings, in which:

Fig. 1 is a vertical longitudinal section taken through certain members of my apparatus, illustrating how the column of food filling material is formed and held in a retaining cage.

Fig. 2 is a side elevation of the food filling material retaining cage showing a strip of dough partially wrapped therearound.

Fig. 3 is a longitudinal section through the food filling retaining cage having the strip of dough wrapped therearound, and placed in a suitable mold.

Fig. 4 is a similar view to Fig. 3, showing the retaining cage partially withdrawn leaving the filling in the shell of dough.

Fig. 5 is a sectional view of the mold after the retaining cage has been completely removed, showing the ends of the dough casing folded in on the ends of the filling material.

Fig. 6 is a transverse section taken on the line 6—6 of Fig. 3.

Fig. 7 is a perspective view of the finished product.

Fig. 8 is a longitudinal section illustrating a modified form of the filling cage.

Fig. 9 is a transverse section taken on the line, 9—9 of Fig. 8.

In carrying out my invention I employ a piston 10, of cylindrical form, provided with the flange 11, having a series of perforations 12 arranged in circular formation at suitable intervals therein. Secured to the piston 10 is the centrally disposed downwardly projecting rod 13 provided at its free end with the loop 14 adapted to serve both as a handle and a stop. An annular collar 9 provided with a centrally disposed perforation 15 is adapted to surround the rod 13 and have sliding relation therewith. The collar 9 has a flange 16 formed thereon, and secured to said flange is a plurality of upwardly extending rods 17, arranged in circular formation and adapted to register with and slide in the perforations 12 and to fit snugly against the outer periphery of the piston 10.

The above recited construction constitutes what may be termed the filling cage and in order that said cage may be conveniently filled with the food pulp, I provide a funnel 18 terminating in a downwardly projecting tube 19, adapted to surround the rods 17, the lower end of said tube resting on the flange 11 of the piston 10.

In order to form the column of food filling material, the pulp is gradually placed in the funnel 18, and tamped down with any suitable plunger (not shown) until it has been built up to a point just below the top ends of the rods 17, as clearly shown in Fig. 1 of the drawings, the piston 10 serving as the bottom of the cage, and the tube 19 serving to prevent the filling material from expanding between the interstices and beyond the outer surfaces of the rods 17.

After the filling material has been packed in the cage, as above described the funnel 18 and tube 19 are removed, and a strip of dough 21 is spirally wrapped around the rods 17, the edges of the same overlapping, as clearly shown in Fig. 2 of the drawings. Sufficient of the dough strip is allowed to project beyond the ends of the filling material at both ends to be eventually tucked in against the ends of the same.

After the dough strip has been wound around the cage as above described, said cage and dough strip are placed in a mold 23, which serves to press the overlapping edges of the dough tightly together and shape the same into an integral tube in such manner that the joining edges will be practically invisible to the eye, and proof against leakage.

The mold 23 comprises a pair of members 24 and 25, provided with the semi-circular grooves 26 and 27 hinged together at 28 in such manner that when said members 24 and 25 are closed, said grooves will co-operate to form a complete circular bore into which the cage with its dough covering is adapted to fit. The members 24 and 25 may be flattened at their bottom as at 30 and 31 in order that the mold may conveniently rest upon a table during the molding and subsequent operations.

After the product has been molded as above described, the cage rods 17 are withdrawn as shown in Fig. 4 of the drawings, the operator during this time holding the flange 11 of the plunger 10 closely against the end wall of the mold in order that the filling material may be held against displacement in the dough shell. When the ends of the rods 17 have been completely withdrawn from the filling material, the collar 9 strikes against the loop 14. The entire cage and plunger are then removed from the mold, and the projecting ends of the dough shell are tucked in over the filling material as clearly shown in Fig. 5 of the drawings, thus providing a complete casing of dough around the filling material. The product as illustrated in Fig. 7 of the drawing is then removed from the mold, and may be cooked in any suitable manner.

In Figs. 8 and 9 I have illustrated a modified form of the cage and plunger construction. In this construction the rods 17 are dispensed with and the collar 9 is provided with a cylinder 33 provided with the slots 34, in which engage fins 35 formed in the plunger 10 adapted to slide therein. The fins 35 serve the same purpose as the flange 11 and need no further description.

Although I have described my apparatus as it may be used where the filling material is of a semi-solid nature, it is obvious that it may be used where the filling material is of a more or less liquid nature. When it is desired to use this class of filling material, the strip of dough may be first wound around the cage, then placed into the mold and the filling material poured into the open end against the plunger. The cage may be then partially withdrawn, and the open end of the dough shell closed. The closed end of the shell may be then held downwardly and the cage then entirely removed from the mold and the opposite end of the dough shell closed.

What I claim is:

1. An apparatus of the class described, comprising a cage adapted to receive interiorly a food product filling, and exteriorly a layer of food dough, and means for withdrawing said cage from between said filling material and dough without disturbing their relative relation.

2. An apparatus of the class described, comprising a cage adapted to receive interiorly a food product filling, and exteriorly a layer of food dough, means for molding the dough layer, and means for withdrawing said cage from between said filling material and dough layer and mold without disturbing their relative relation.

3. An apparatus of the class described, comprising a cage provided with a bottom having slidable relation therewith and means co-operating with the open end of said cage whereby it may be conveniently filled with a food product.

4. An apparatus of the class described, comprising a cage formed of a plurality of rods adapted to receive a food product, a bottom for said cage adapted to fill the area formed within said rods, means for holding said bottom stationary, and means for sliding said cage relative to said bottom.

5. An apparatus of the class described, comprising a cage formed of a plurality of rods adapted to receive a food product, said rods being arranged in circular formation and secured to a sleeve at one of each of their ends, a plunger arranged to project into said cage and adapted to be guided by and to have sliding relation with said rods, a stem for said plunger, and a tube terminating in a funnel adapted to surround said rods.

6. An apparatus of the class described, comprising a cage adapted to receive interiorly a food product, and exteriorly a layer of food dough, a mold adapted to open and close to receive said cage and food product, and means for removing the cage from said mold without disturbing the relative relation of said food products and mold.

In witness that I claim the foregoing I have hereunto subscribed my name this 27th day of June, 1919.

FRANCIS J. T. O'BRIEN.